March 7, 1972 J. M. COX 3,647,556
STORAGE BATTERY COVER
Filed June 26, 1970

INVENTOR.
John M. Cox
BY
Lawrence B. Plaut
ATTORNEY

United States Patent Office 3,647,556
Patented Mar. 7, 1972

3,647,556
STORAGE BATTERY COVER
John M. Cox, Pendleton, Ind., assignor to General Motors Corporation, Detroit, Mich.
Filed June 26, 1970, Ser. No. 50,222
Int. Cl. H01m 1/02
U.S. Cl. 136—170                    2 Claims

ABSTRACT OF THE DISCLOSURE

A one-piece storage battery cover having electrolyte filler openings covered and sealed by integrally formed life-hinged lids having integrally formed plugs which engage the openings in an interference fit. In the closed position, the lids are substantially flush with the top of the battery cover. Tabs for lifting the lids are provided.

---

This invention generally relates to covers for storage battery containers and especially covers in which the means for venting, filling and closing the battery are an integral, molded-in part of the cover itself.

The subject invention is a one-piece, injection molded polypropylene battery cover having electrolyte filler wells, venting wells, and plug-bearing life-hinged lids for sealing the filler wells all molded into the cover. The cover is formed in a single operation using injection molding techniques and is both aesthetically appealing and conveniently functional. The lid is held in the closed position by means of an interference fit between a filler opening and a plug molded on the underside of the lid. A molded-in life hinge attaches the lid to the cover. The lid follows an arcuate path in closing off the filler tubes. The filler plug is so dimensioned that there is no interference between it and the filler opening while entering along the arcuate path taken by the lid except at the last moment during the final seating of the plug in the opening. Discrete vent and/or filler plugs are elimintaed. The lid seats in a hollow or depression in the cover thereby contributing to aesthetics of the finished product by presenting a flat surface.

It is an object of this invention to provide a conveniently functional, aesthetically appealing battery cover having means for filling, venting, closing and sealing molded into a single piece.

Figure 1:
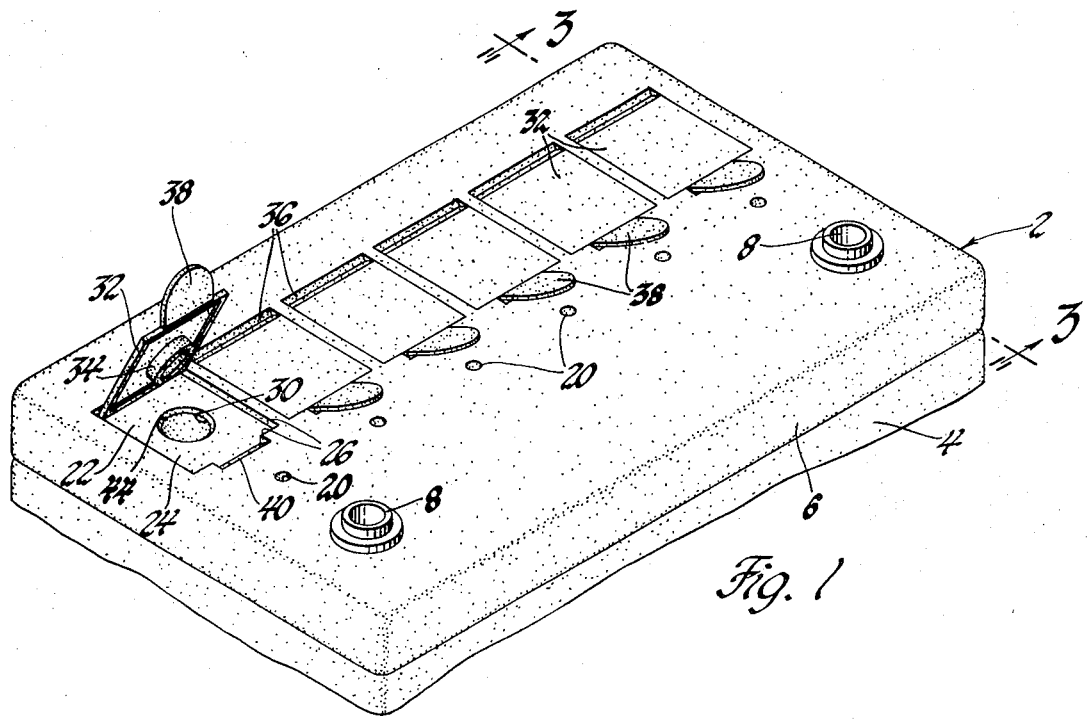
FIG. 1 is a perspective view of a battery cover within the scope of this invention.
Figure 2:
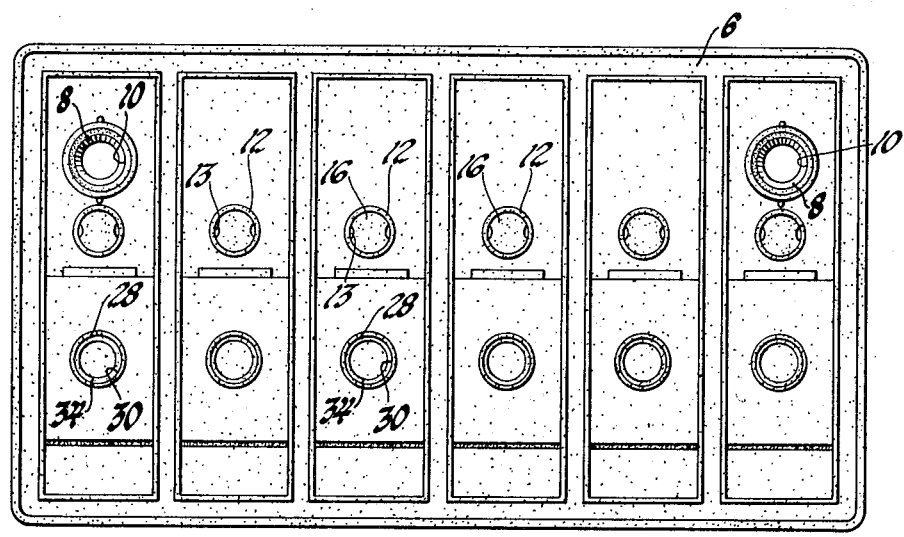
FIG. 2 is a bottom view of the cover of FIG. 1.
Figure 3:
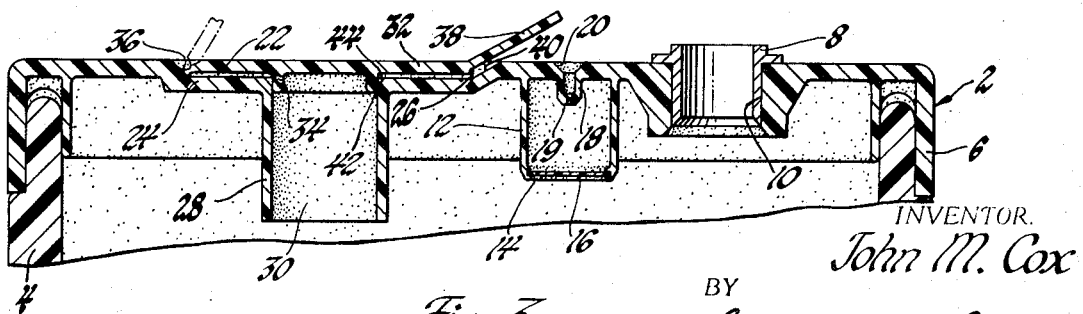
FIG. 3 is a side sectional view taken through the section line 3—3 of the cover shown in FIG. 1.

Referring now to the drawings, there is shown a battery 2 comprising a case 4 and cover 6. The cover 6 is formed by the injection molding of polypropylene into an appropriate mold. The term polypropylene is intended to include the homo-polymer as well as mixed polymers thereof such as the ethylene-propylene copolymers. While other polymers might be used, only polypropylene will produce a molded-in hinge which will withstand repeated flexing for the practical life of the battery.

In batteries having top terminals, an insert 8 is provided in an aperture 10. A connector (not shown) which is joined to the batteries' plates extends upwardly through the insert 8 and is fused to the insert and a terminal (not shown) which is cast atop the insert 8. For sealed or side terminal batteries such as disclosed in United States patent application Ser. No. 799,666, there is no need to provide the insert 8 or aperture 10. United States patent application Ser. No. 799,666 was filed in the names of Rowls et al. on Feb. 17, 1969 and is assigned to the assignee of the present invention.

A tubular vent well 12 is molded into, and extends downwardly from, the underside of the cover 6 into the individual cells, which are separated one from the other in the battery by appropriate partitions (not shown). A recess 14 is provided in the lower end of the vent well 12 to receive a conventional baffle plate 16. The baffle plate 16 has apertures 13 which permit the passage of gases out of the cell into the vent well but reduce the outflow of entrained liquid. In addition, a nipple-like vent tube 18, having a through-hole or vent passage 20, extends from the cover 6 into vent well 12. The tip 19 of the vent tube 18 would be molded closed, but would be pierced, e.g., with an ice pick or the like, before the cover is assembled on wet batteries, or after filling with acid in the case of dry batteries. The tip end of the tube 18 is preferably tapered on the inside to prevent the piercing instrument from passing completely through the passage 20 and damaging the battery plates or the baffles 16.

A portion of the top of the cover 6 is recessed to form a hollow or depression 22 which is defined by side and bottom walls 24 and 26 respectively. A tubular filler well 28, having filler opening 30 therethrough, is molded into and extends downwardly from the bottom wall 24 into the battery. The end of the filler opening 30 has a predetermined inside diameter of about 0.687 inch. An integrally molded and hinged lid 32, which substantially conforms to the shape of the hollow 22, is closely fitted into the hollow 22 to cover the filler opening 30. A tubular plug portion 34 on the underside of the lid 32 engages the opening 30 by an interference fit to hold the lid 32 in the closed position and seal the opening 30 from electrolyte leakage. An interference fit, as used herein, is intended to define a fit where the O.D. of the plug 34 is always a bit larger than the I.D. of the opening 30 even when the hole is the largest and the plug the smallest that specified tolerances will permit. The lid 32 is actually molded with the cover 6 by means of a thin section or life-hinge 36 which, as indicated, attaches the lid 32 to the cover 6 along one wall of the hollow 22. A tab 38 is provided for grasping of the lid 32 in order to expose the filler well. Any convenient means for opening and closing the lid 32, other than a tab, of course could be provided. In this regard, a simple slot into which an implement, such as a screw driver, might be inserted to pry the lid open could be used. A cutaway portion 40 is provided in one of the walls 26 to accommodate the tabs 38.

The plug 34 is a short (i.e., about 0.156 inch) tubular projection which preferably has an outside diameter of about 0.69 inch. This is about 0.003 inch larger than the inside diameters of the opening 30. With such dimensions there is virtually no interference during entry of the plug 34 into the opening 30 along the arcuate path followed by the lid 32 pivoting about hinge 36. The interference fit between the plug 34 and the opening 30 occurs just before plug 34 becomes fully seated. This occurs when the edge 42 of the plug 34 which is most remote from the hinge 36 engages the slightly bevelled edge 44 of the opening 30. Little effort is required to open or close the lid 32. Nonetheless, there is sufficient holding power in the interference fit to hold the lid 32 closed and seal the battery while in use.

Batteries employing the cover of this invention are readily serviced. There is no fumbling or dropping of vent lugs. At the same time, an aesthetically appealing appearance is provided.

While I have disclosed my invention solely in terms of a particular preferred embodiment thereof, I do not intend to be limited thereto, except to the extent hereinafter recited.

What is claimed is:
1. A storage battery comprising a case and a one-piece polypropylene cover for said case, said cover comprising an integral molded-in vent well extending into said case; a baffle plate fitted to the end of said vent well opposite said cover; an integral, molded-in passage through said cover communicating said vent well with the atmosphere; a hollow molded into the outer side of said cover, said hollow being defined by side and bottom walls; a molded-in filling well comprising a tube integral with said bottom wall extending into said case, said tube having an opening therethrough of predetermined inside diameter; a lid for said filling well, said lid closely fitting into said hollow; a thin-sectioned, molded-in hinge joining said lid to said cover along one wall of said hollow; a molded-in tubular plug integral with the underside of said lid for mating with said opening, said plug having a larger outside diameter than said predetermined inside diameter, there being an interference fit between said plug and said opening when said lid is closed but no substantial interference between said plug and said opening while said plug enters said opening along an arc-like path which is pivotal about said hinge; and means for raising said lid.

2. A storage battery comprising a case and a one-piece polypropylene cover for said case, said cover comprising an integral molded-in vent well extending into said case; a baffle plate fitted to the end of said vent well opposite said cover; an integral, molded-in, nipple-like, vent tube depending from said cover into said vent well providing a vent passage through said cover; a hollow molded into the outer side of said cover, said hollow being defined by side and bottom walls; a molded-in filling well comprising a tube integral with said bottom wall extending into said case, said tube having an opening therethrough of predetermined inside diameter; a lid for said filling well, said lid closely fitting into said hollow; a thin-sectioned, molded-in hinge joining said lid to said cover along one wall of said hollow; a molded-in tubular plug integral with the underside of said lid for mating with said opening, said plug having a larger outside diameter than said predetermined inside diameter, there being an interference fit between said plug and said opening when said lid is closed but no substantial intereference between said plug and said opening while said plug enters said opening along an arc-like path which is pivotal about said hinge; and means for raising said lid.

References Cited

UNITED STATES PATENTS

| 2,716,147 | 8/1955 | Laughlin | 136—177 |
| 3,369,940 | 2/1968 | Slautterback | 136—170 |
| 3,485,678 | 12/1969 | Blaich et al. | 136—170 |

DONALD L. WALTON, Primary Examiner

U.S. Cl. X.R.

136—177